Nov. 29, 1966   J. F. DUFFIELD ETAL   3,288,959
LAMPHOLDER WITH CURRENT TAP

Filed Dec. 10, 1964   7 Sheets-Sheet 1

FIG. I

INVENTORS
JOSEPH FREDERICK DUFFIELD
CHARLES RICHARD DIROM KINDERSLEY, DECEASED,
BY THE ROYAL TRUST COMPANY, ADMINISTRATOR.

By Cushman, Darby & Cushman
Attorneys

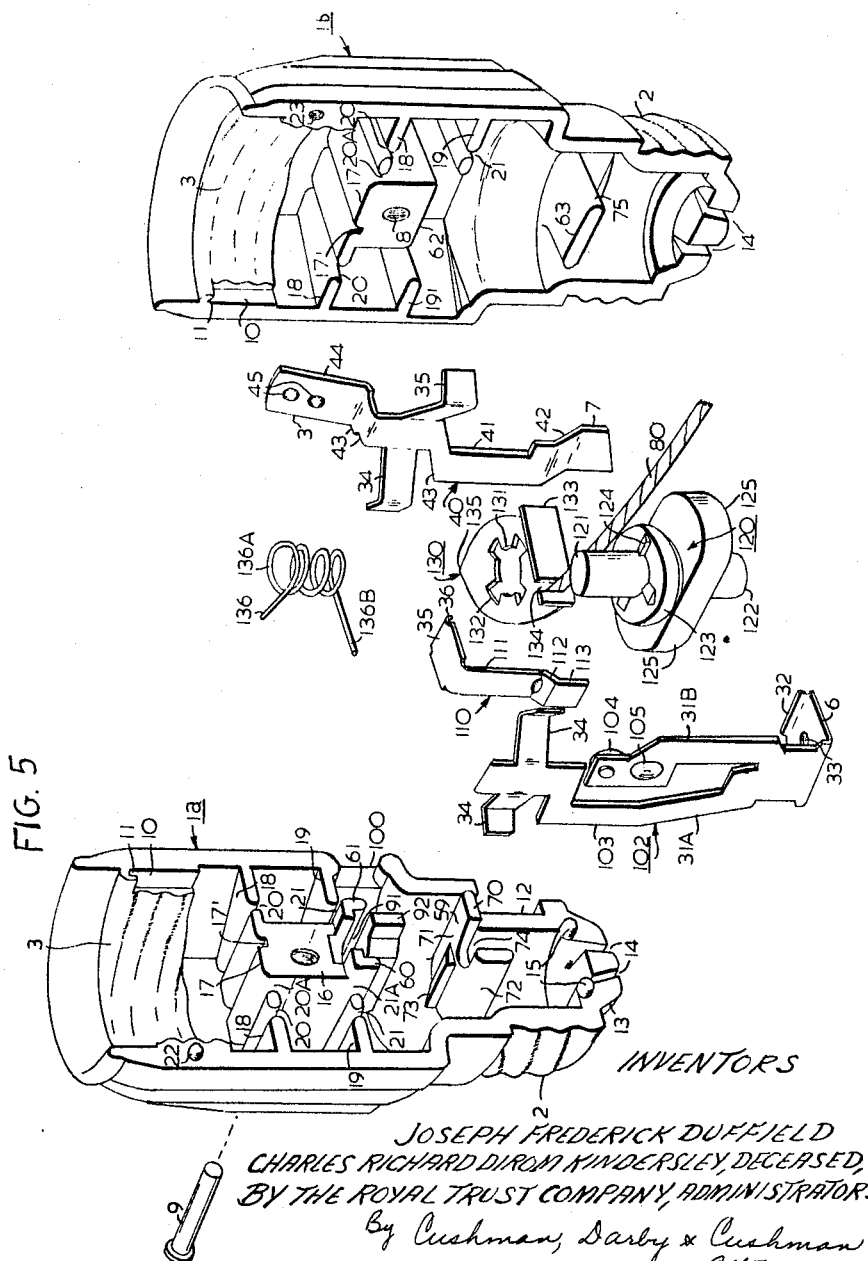

Nov. 29, 1966   J. F. DUFFIELD ET AL   3,288,959
LAMPHOLDER WITH CURRENT TAP
Filed Dec. 10, 1964   7 Sheets-Sheet 6

INVENTORS
JOSEPH FREDERICK DUFFIELD
CHARLES RICHARD DIROM KINDERSLEY, DECEASED,
BY THE ROYAL TRUST COMPANY, ADMINISTRATOR.

By Cushman, Darby & Cushman
Attorneys

United States Patent Office 3,288,959
Patented Nov. 29, 1966

3,288,959
LAMPHOLDER WITH CURRENT TAP
Joseph Frederick Duffield, Georgetown, Ontario, Canada, and Charles Richard Dirom Kindersley, deceased, late of Georgetown, Ontario, Canada, by the Royal Trust Company, administrator, Toronto, Ontario, Canada, assignors to Smith & Stone Limited, Toronto, Ontario, Canada, a company of Canada
Filed Dec. 10, 1964, Ser. No. 417,447
Claims priority, application Canada, Sept. 29, 1964, 912,800
1 Claim. (Cl. 200—51.14)

This invention relates to current tap lampholders having a unique construction whereby the moldings used in the construction thereof are adaptable for use with lampholders having switching means or unswitched lampholders.

The invention, in particular, provides means for visually checking of the assembly and mechanical functions of the internal mechanism before final closure of the assembly.

It is known to provide current tap lampholders having a plurality of internal conductors which in many cases have springy portions adapted to co-operate with plugs and the contact surfaces of electric light bulbs. In such prior known current tap lampholders the assembly of the same has been haphazard, finicky, and necessarily time consuming because in many cases individual contact members within the assembly have not been positively located until the second half of the assembly is placed in position. If, therefore, any one of the internal conductive members has moved out of position prior to assembling the cover in position, the current tap lampholder has in many cases had to be stripped down again, often entailing the drilling out of a rivet or other fastening, in order to rectify the error in assembly.

With the addition of a switch the difficulties of assembly have been considerably magnified and in prior known switches, the majority of which have been included a ratchet and pawl and one or more springs, the assembly of such switches had become most time consuming. Even where the positioning of the internal contacts and switch members have been placed in position it has not been previously possible to completely test the co-operation of the internal elements before placing the second half of the cover in position.

One object of one aspect of this invention is to provide a current tap lampholder having a configuration providing for a visual inspection of the internal elements prior to closure of the cover.

An object of a further aspect of this invention is to provide a current tap lampholder having a molding which is adaptable to provide both switched and unswitched versions without the necessity for modifications to the basic molding.

A preferred embodiment of the invention will now be described with reference to the accompanying drawings in which:

FIGURE 5 is an exploded view of the switched version of the current tap lampholder shown in FIGURE 4.

Figure 1:
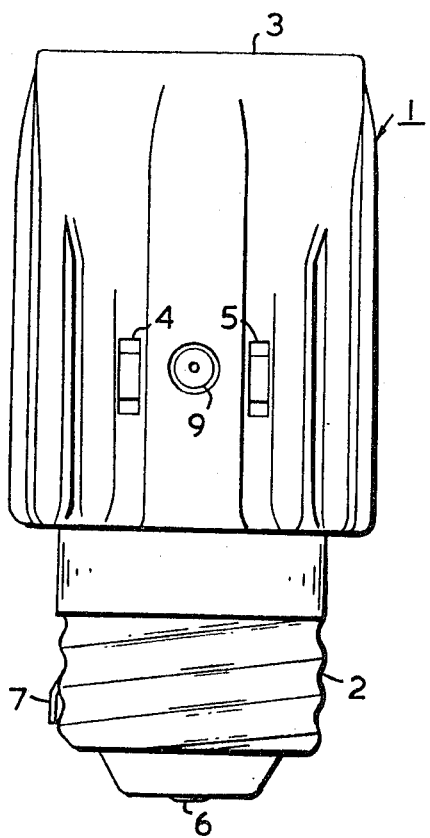
FIGURE 1 is a side elevation of a current tap lampholder in accordance with the present invention.

Referring now to FIGURE 1, there is shown a side elevation of a current tap lampholder generally indicated at 1. The lampholder has as its lower end a molded male thread formation 2 and at the upper end a molded female thread formation 3 as will be described hereinafter. Apertures 4 and 5 are for the reception of a duplex plug. A center contact is provided at 6 and part of the side contact 7 for the male threaded formation 2 is shown.

Figure 2:
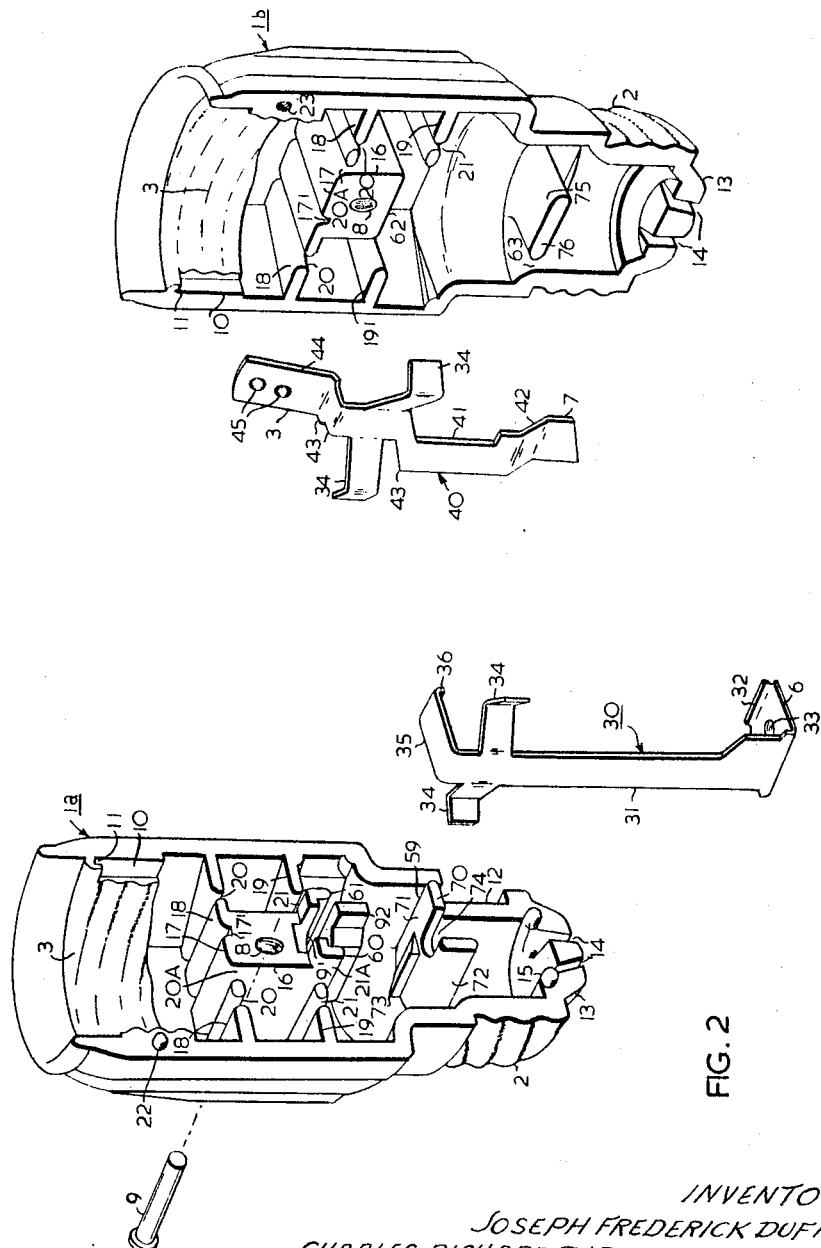
FIGURE 2 is an exploded view of the lampholder shown in FIGURE 1.

Referring now to FIGURE 2 it will be seen that the lampholder comprises two substantially identical halves, 1a and 1b, respectively. The two halves each include a central block 16 through which extends transverse aperture 8 adapted to receive a rivet 9 for securing two halves, 1a and 1b, together for assembly purposes. In the female threaded portion 3 there is provided, at the plane of junction of the two halves 1a and 1b, a side contact receiving slot 10 having an undercut 11 for retaining therein a side contact member to be discussed hereinafter. The left-hand half, 1a, further includes a recess 12 for receiving the side contact member 7 shown in FIGURE 1. However, unlike the recess 10 for the female side contact, the recess 12 is confined to the one-half, 1a, and the associated portion of a side contact member to be discussed hereinafter is offset so that the side contact 7 is wholly retained in the left-hand half, 1a, at this point. The male threaded portion 2 further includes a truncated extension 13 having therein a pair of slots 14 for receiving a center contact 6. The left-hand half 1a, also includes a pair of spigots 15 adapted to co-operate with the inner walls of the associated region of the right-hand half 1b in order to facilitate alignment of two halves during assembly. The central block 16 has an upper surface 17 adapted to back-up a portion of the center contact for the female threaded formation 3 which contact will be described hereinafter. A pair of transverse horizontal partition members 18 include a pair of slots 20 and a single slot 20A for receiving contact members. Similarly, lower horizontal transverse partition members 19 are shown, having a single slot 21 in the right-hand half 1a.

The left-hand half 1a further includes a transverse cam bearing member 70 having an upper surface 71 and an integrally formed vertical portion 72. On the upper surface there is formed a tooth 73 and, adjacent the plane of juncture of the two halves, 1a and 1b, bearing member 70 includes a recess 74. A slit 59 is provided between member 70 and the inner wall of the left-hand half 1a. The slit 59 is disposed immediately above recess 12 and is adapted to receive a contact member to be described hereinafter.

The left-hand half 1a of the lampholder further includes a pair of projections 60 and 61 integrally formed with the central block 16, which projections are received under the corresponding block 16 during assembly with underface 62 of the said central block 16 in the right-hand half. The right-hald half 1b further includes a slot 63 for retaining a side-contact member in position. In the left-hand half 1a, there is provided a cam receiving recess 91, of inverted T configuration and disposed on the underside of block 16, a cam-plate stop 92 projects outwardly.

The right-hand half 1b includes a cam retaining member 75 having an end face 76 which face, upon uniting the two halves together, serves to close off the recess 74 in the cam bearing member 70 in the left-hand half 1a.

Referring again to FIGURE 2, there is shown a first contact generally indicated at 30, said contact having a central portion 31 and a lower center contact portion 6 horizontally disposed in relation to the central portion 31. The center contact portion 6 further includes an upturned tab 32, and a downward facing dimple 33 for improving electrical contact with an associated center contact or a receiving fixture. The central portion 31 includes a pair of outwardly extending duplex receptacle contact portions 34 which contacts are bent intermediate their length in order to provide easy entry of a duplex receptacle blade as will be described hereinafter. An upper central contact portion 35 is horizontally disposed to the central portion 31 and further includes a downward extending tab 36 adapted to be received in recess 17' in the central block 16.

A second contact is generally indicated at 40 and includes a central portion 41 and a side contact region 7 which region is offset outwardly by a joggle 42. The central region 41 has a coplanar offset 43 above which two duplex receptacle contacts 34 extend outwardly and transversely. Above the duplex receptacle contacts 34 the central limb is outwardly and upwardly bent as at 43 to form a side contact 44 for the upper thread formation 3. The side contact 44 includes a pair of inwardly facing dimples 45 adapted to co-operate with a thread formation on an electric lamp and thereto to improve the electrical connection therebetween.

Figure 3:
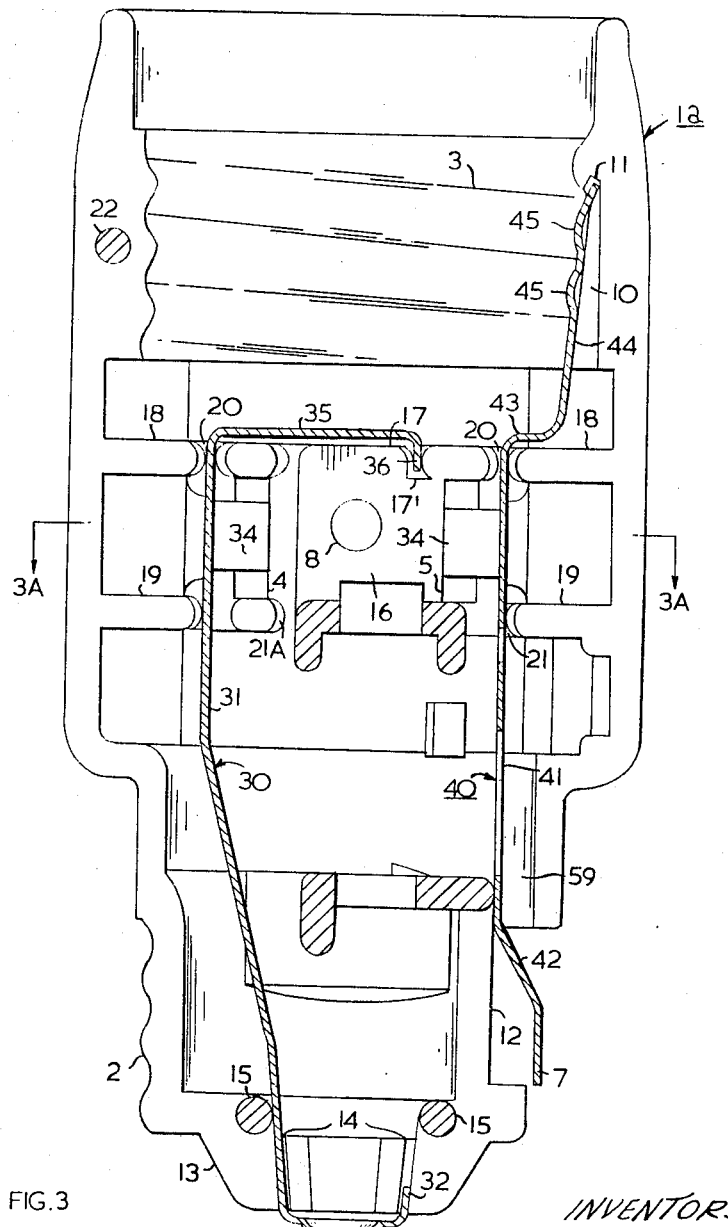
FIGURE 3 is an inside view of one-half of the lampholder shown in FIGURE 1, to a larger scale and said elements being shown in section, having placed therein removable contact elements, said elements being shown in section.
Figure 3A:
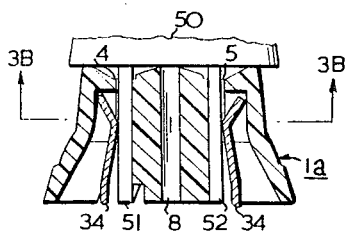
FIGURES 3a and 3b show details, in section and to a reduced scale of one of the pair of plug sockets and the contacts associated therewith.
Figure 3B:
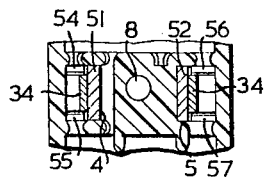

Referring now to FIGURES 3a and 3b there is shown in section a portion of the current tap lampholder shown in FIGURE 3. Inserted into apertures 4 and 5 is a duplex plug 50 having blades 51 and 52. Blades 51 and 52 are shown bearing respective duplex receptacle contacts 34. Referring now in particular to FIGURE 3b, there is shown shoulders 54, 55, 56 and 57. It will be seen that one duplex receptacle 34 is free to move between shoulders 54 and 55 against the section of blade 51 and the other duplex receptacle contact 34 is free to move between shoulders 56 and 57 against pressure from blade 52. However, should the duplex plug 50 be inserted into apertures 4 and 5 in a skew manner the shoulders 54, 55, 56 and 57 prevent undue deformation of contact elements 34.

Assembly of the current tap lampholder 1 entails the positioning of the first contact 30 into the left-hand half, 1a, so that the portion 31 is received in slots 20 and 21 and in one of the said slits 14 in the truncated portion 13. Slight deformation of the initially straight portion 31 serves to keep the contact 31 in position. Upturned flange 32 is at the same time received in the other of the two slits 14. When thus inserted, portion 35 is positioned on surface 17 of central block 16 and the tab 36 is received in recess 17'. Similarly, the second contact 40 is placed in the left-hand half, 1a, of the current tap lampholder so that the portion 41 is received in slots 20, 21, and slit 59 and at the same time the extension 44 is received in recess 10 of the female screwed portion 3 and retained therein by the undercut 11. Portion 7 of the second contact 40 is placed in position in recess 12 by location of a portion of the limb 41 in slit 59 as previously described. In this position the one each of the portions 34 are positioned opposite an aperture 4 or 5. Once the two contact members 30 and 40 have been placed in position, the right-hand half 1b, of the lampholder is placed over the left-hand half, 1a, and the rivet 9 passed through aperture 8, the rivet scouring both halves, 1a and 1b, of the lampholder together.

Figure 4:
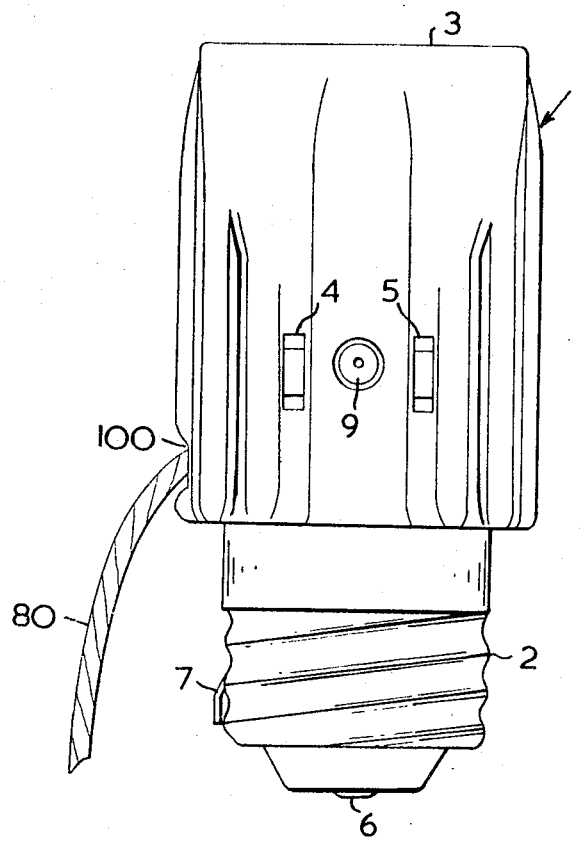
FIGURE 4 is a side elevation of a switched version of the current tap lampholder shown in FIGURE 1.

Referring now to FIGURE 4, there is shown a side view, similar to that shown in FIGURE 1 of the current tap lampholder 1 adapted to include switching means and the switch is operated by a pull cord 80. FIGURE 5 is an exploded view of the switched lampholder shown in FIGURE 4. The lampholder body halves, 1a and 1b, are substantially identical excepting for the inclusion of an aperture 100 adapted for passing the nylon pull cord 80 into the interior of the lampholder. A first contact generally indicated at 102 corresponds to the first contact 30 of the previous embodiment. The central portion 31, however, is divided into two parts 31A and 31B. Central portion 31A extends upwardly to join the duplex receptacle contacts 34 as in the previous embodiment, however, the portion 31A has a coplanar offset as at 103 to provide clearance for the other central portion 31B. The upper extremity of the central portion 31B includes a contact pad 104 and immediately below this pad there is a rearward facing dimple 105. An upper center and independent contact generally indicated at 110 includes a central portion 111 and a center contact portion 35 having a downward extending tab 36. The lower end of the upper center contact 110 is outwardly joggled as at 112 to form a switch contact region 113 adapted to co-operate with the contact pad 104 on the first contact 102. The second contact 40 is identical in all respects to the second contact shown in the first embodiment.

Figure 5A:
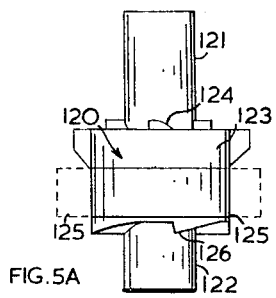
FIGURE 5a shows details of a cam member for the switch version shown in FIGURE 5.
Figure 5B:
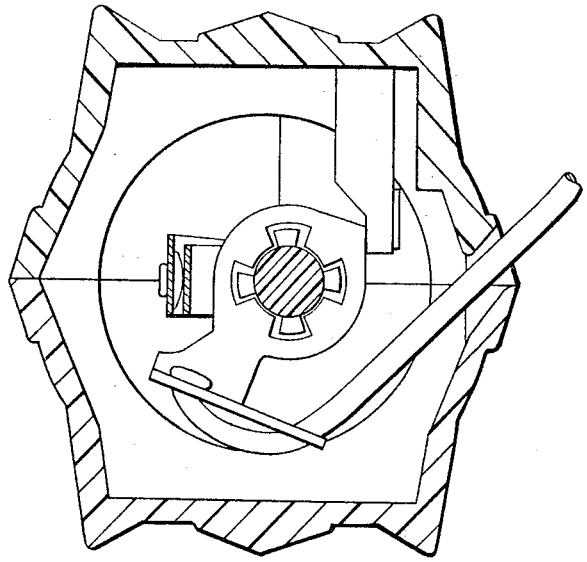
FIGURE 5b is a horizontal section of the lampholder showing means for restricting movement of the cam plate.

A cam member, shown in detail in FIGURE 5a, is generally indicated at 120 and includes an upper shaft 121, a lower shaft 122, and a boss 123 having, on the upper surface thereof four ratchet teeth 124. The cam member also includes a pair of cam lobes 125 which lobes are adapted upon assembly of the switch to co-operate with the dimple 105 on the first contact 102. Four further teeth 126 are located on the underside of the cam 120, said teeth being adapted to engage, on assembly, tooth 73 on cam bearing member 70. A cam-plate 130 includes a circular aperture 131 having formed around the periphery thereof four detents 132 adapted to co-operate with the teeth 124 on the cam 120. The cam-plate 130 further includes an upturned portion 133 having a slot 134 formed therein for the reception, as shown, of the pull cord 80. The cam-plate is retained into resilient engagement with the teeth 124 by a spring 136 as will be described hereinafter. The cam-plate 130 includes a stop lobe 135 adapted to co-operate upon assembly, with cam-plate stop 92 in the left-hand half 1a, as shown in FIGURE 5b. The spring 136 is of helical formation, the end turns of which extend tangentially to form torque arms 136A and 136B.

Figure 6:
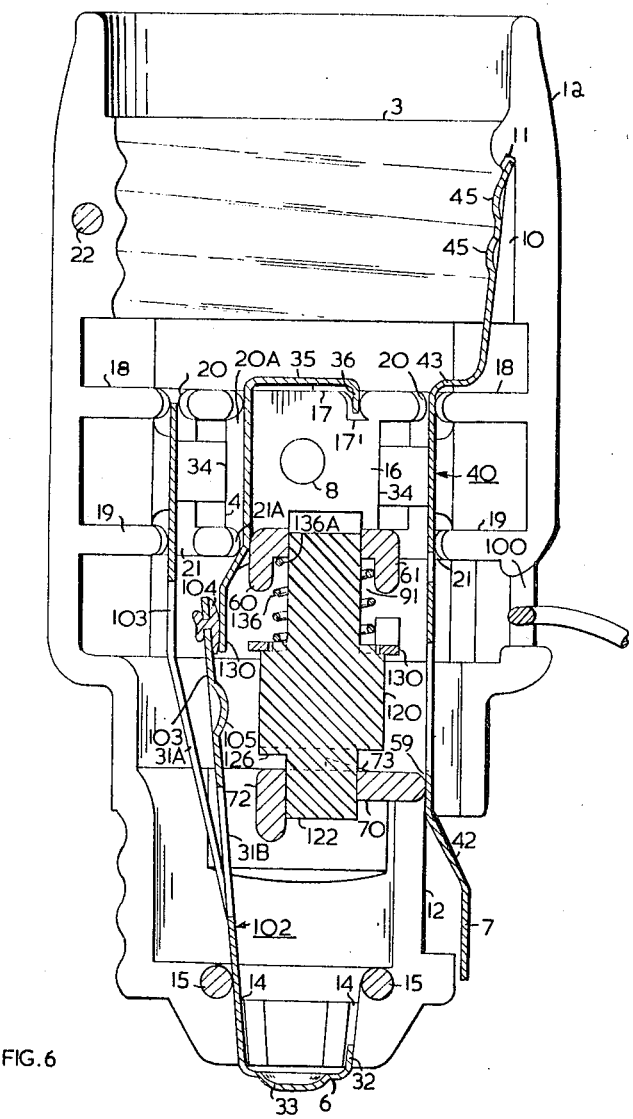
FIGURE 6 is an inside view of one-half of the switched version of the current tap lampholder showing the active elements of the switch and associated contacts in section.

Assembly of the switched version of the current tap lampholder 1 follows the same procedure as for the unswitched version already described. The contact 102 is placed in the left-hald half 1a by passing the contact into appropriate slots 20, 21 and 14. Contact 40 is placed in position by threading the contact into appropriate slots 20, 21 and 59. After the nylon cord 80 has been secured into slot 134 of cam plate 132 the cam plate is threaded over upper shaft 121 of cam member 120. The spring 136 is likewise threaded over the upper shaft 121 of the cam assembly 120 to lay on top of cam plate 130. The cam member 120, the cam plate 130 and spring 136 as assembled, are then placed in position in the left-hand half 1a whereby the lower shaft 122 is received in recess 74 and the upper shaft 121 is received in the recess 91, as better shown in FIGURE 6. When thus positioned, the spring 136 maintains cam plate 130 into resilient engagement with the teeth 124 on the boss 123 of the cam member 120. The same downward pressure from the spring 136 also maintains teeth 126 at the lower end of the cam member 120 into resilient engagement with the tooth 73 on the cam bearing member 70. The spring 136 is so positioned that portion 136B is in contact with upturned portion 133 of cam plate 130 and portion 136A of the spring 136 is located along one side of the recess 91 as is shown in FIGURE 6. Thus when the cord 80 is pulled the cam plate 130 is rotated, via teeth 73 and 124, in an anti-clockwise direction, looking downwardly on the cam plate 130, and such rotation tensions the spring 136. It will be appreciated that this rotation of the cam member 120 through an angle of 90 degrees, from the position shown in FIGURE 5, is sufficient to move contact 104 away from portion 113 of the upper contact 110 thereby opening the electrical circuit. A further rotation of 90 degrees of the cam member 120 moves the cam out of engagement with contact 102 thereby enabling contact 114 to re-establish electrical connection with portion 113 of upper contact 110. Thus, when tension is removed from the pull cord 80 the upper cam plate 130 comes into contact with cam stop 92 as best seen in FIGURE 5b.

The current tap lampholder herein disclosed permits quick assembly and visual and mechanical checking of the movable elements in one-half of the casing before the two halves of the casing are fastened together.

The embodiments of the invention in which an exclusive property or privilege is claimed are defined as follows:

A lampholder with current tap comprising a hollow body member split into two separable parts along a longitudinal plane and formed of moldable insulating material, said body including:
 (a) lamp receiving means at one end thereof,
 (b) a male plug at the other end thereof for reception in a plug receptacle,
 (c) a pair of apertures through the wall for receiving a duplex plug,
 (d) a first transverse partition adjacent said lamp having first and second slots for receiving and locating first and second strip contacts respectively,
 (e) a second transverse partition adjacent said male plug having a third slot for receiving and locating said second strip contact,
 (f) a fourth slot in the male plug for receiving and locating said first strip contact, one of said slots and said fourth slot, and the other of said first slots and said third slots having a predetermined alignment, all of said slots permitting the assembly and testing of said strip contact members into one of said two separable parts without the co-operation of the other of said two separable parts, one part of said hollow body member including
 (g) a fifth slot in the first transverse partition, for receiving and retaining an independent center contact,
 (h) upper and lower cam shaft receiving apertures,
 (i) a ratchet tooth,
 (j) a cam plate stop, and,
 (k) spring receiving and stop means, the other part of said hollow body member including upper and lower cam shaft retaining projections; a cam member including:
 (l) upper and lower cam shafts for reception into (h),
 (m) a boss having a cam lobe, upper cam plate engaging teeth, and ratchet engaging teeth, thereon; a cam plate including:
 (n) detents thereon for co-operation with said upper cam plate engaging teeth on said cam member,
 (o) a stop,
 (p) a pull-cord attachment means, and,
 (q) spring engaging means; a pull cord attached to said cam plate; a spring having first and second torque arms; a first strip contact member including,
 (r) a central region for reception in said first and fourth slots,
 (s) a first center contact region forming a center contact at said lamp receiving end,
 (t) a second center contact region forming a center contact at said male plug receiving end, and,
 (u) a duplex plug contact region aligned with one of said pair of apertures, said central region of the said first strip contact member being divided into two parts, the first part of which extends upwardly to join said duplex plug region and the second part of which forms a cam operated deformable region having a contact area thereon, and wherein said center contact region is physically separated from said central region; a second strip contact member including:
 (v) a central region for reception in said second and third slots,
 (w) a first side contact region forming a side contact for said lamp receiving end,
 (x) a second side contact region forming a side contact for said plug end, and,
 (y) a duplex plug contact region aligned with the other of said pair of apertures; a central portion for reception and retention in said fifth slot; a center contact region forming said center contact and said lamp receiving end; a switch contact region, for selective electrical connection with said contact area on said first contact; and, means fastening said two separable parts together.

References Cited by the Examiner
UNITED STATES PATENTS

| | | | |
|---|---|---|---|
| 1,857,178 | 5/1932 | Benander | 339—161 |
| 1,986,895 | 1/1935 | Muldoon | 200—51.02 |
| 2,114,826 | 4/1938 | Zeloy | 200—51.14 |
| 3,205,471 | 9/1965 | Herrmann. | |

ROBERT K. SCHAEFER, *Primary Examiner.*

D. SMITH, JR., *Assistant Examiner.*